United States Patent
Niu et al.

(10) Patent No.: US 12,202,476 B2
(45) Date of Patent: Jan. 21, 2025

(54) VEHICLE MAP DATA MANAGEMENT

(71) Applicant: Ford Global Technologies, LLC, Dearborn, MI (US)

(72) Inventors: Yuming Niu, Northville, MI (US); Jacob Slimak, Troy, MI (US); Md Tawhid Bin Waez, Canton, MI (US); Zhichao Lu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 17/826,259

(22) Filed: May 27, 2022

(65) Prior Publication Data

US 2023/0382372 A1 Nov. 30, 2023

(51) Int. Cl.
*B60W 30/12* (2020.01)
*B60W 30/18* (2012.01)
*B60W 60/00* (2020.01)

(52) U.S. Cl.
CPC ...... *B60W 30/12* (2013.01); *B60W 30/18109* (2013.01); *B60W 60/001* (2020.02); *B60W 2510/18* (2013.01); *B60W 2510/20* (2013.01)

(58) Field of Classification Search
CPC .......... B60W 30/12; B60W 30/18109; B60W 60/001; B60W 2510/18; B60W 2510/20; B60W 2552/53; B60W 2556/50; B60W 10/20; B60W 10/18; G01C 21/30; G01C 21/34
See application file for complete search history.

(56) References Cited

U.S. PATENT DOCUMENTS

| | | | |
|---|---|---|---|
| 8,626,391 B2 | 1/2014 | Kim | |
| 9,285,805 B1* | 3/2016 | Pollock | B60W 40/072 |
| 9,310,214 B1 | 4/2016 | Tzamaloukas | |
| 9,568,916 B2* | 2/2017 | Pollock | G06V 20/56 |
| 11,443,465 B2* | 9/2022 | Dorum | G06T 11/203 |
| 2017/0016730 A1* | 1/2017 | Gawrilow | G01C 21/30 |
| 2020/0209370 A1* | 7/2020 | Zhang | G01S 7/003 |
| 2020/0348408 A1 | 11/2020 | Peng et al. | |
| 2021/0132213 A1* | 5/2021 | Advani | G01S 13/862 |
| 2021/0192841 A1* | 6/2021 | Hu | G01S 13/867 |
| 2021/0224557 A1* | 7/2021 | Miyagawa | G01C 21/30 |
| 2021/0247771 A1* | 8/2021 | Watanabe | G01C 21/3837 |
| 2021/0325197 A1* | 10/2021 | Ohmura | G01C 21/3484 |
| 2021/0354729 A1* | 11/2021 | Ng | B60W 60/0018 |
| 2022/0126824 A1* | 4/2022 | Kato | B60W 10/20 |
| 2022/0291009 A1* | 9/2022 | Imai | G01C 21/30 |
| 2022/0355793 A1* | 11/2022 | Kurokawa | B60W 30/095 |

(Continued)

FOREIGN PATENT DOCUMENTS

CN 110706307 A 1/2020

*Primary Examiner* — Sze-Hon Kong
(74) *Attorney, Agent, or Firm* — Frank A. MacKenzie; Brooks Kushman P.C.

(57) ABSTRACT

A computer includes a processor and a memory, and the memory stores instructions executable by the processor to receive a set of points indicating a lane boundary; select a first subset of the points, wherein the set of points includes a first point that is not in the first subset; determine a path of the lane boundary based on the first subset of the points; and, upon determining that the first point is greater than a threshold distance from the path, add the first point to the first subset.

20 Claims, 3 Drawing Sheets

(56) References Cited

U.S. PATENT DOCUMENTS

| | | | |
|---|---|---|---|
| 2023/0078294 A1* | 3/2023 | Ishida | G08G 1/0965 |
| | | | 701/25 |
| 2023/0084021 A1* | 3/2023 | Im | B60W 60/001 |
| | | | 701/1 |
| 2023/0103248 A1* | 3/2023 | Abrash | B60W 60/0027 |
| | | | 701/26 |
| 2023/0152120 A1* | 5/2023 | Ikeda | G01C 21/3815 |
| | | | 701/450 |
| 2023/0174061 A1* | 6/2023 | Aizawa | G06V 20/58 |
| 2023/0281927 A1* | 9/2023 | Matsunobu | G06T 7/70 |
| | | | 345/420 |
| 2023/0286583 A1* | 9/2023 | Uemura | B62D 15/0255 |
| 2023/0303079 A1* | 9/2023 | Okunishi | B60W 30/18163 |

* cited by examiner

VEHICLE MAP DATA MANAGEMENT

BACKGROUND

Some vehicles are equipped to operate autonomously or semi-autonomously. A computer on board a vehicle is programmed to operate the vehicle partially or fully independently of the intervention of a human operator. The computer is programmed to operate the propulsion, brake system, steering system, and/or other vehicle systems. Autonomous operation means the computer controls the propulsion, brake system, and steering system without input from a human operator; semi-autonomous operation means the computer controls one or two of the propulsion, brake system, and steering system and a human operator controls the remainder; and nonautonomous operation means a human operator controls the propulsion, brake system, and steering system. Semi-autonomous operation includes advanced driver assistance systems (ADAS). ADASs are groups of electronic technologies that assist drivers in driving and parking functions. Examples of ADAS include automatic emergency braking, adaptive cruise control, and lane-keeping assistance.

DETAILED DESCRIPTION

Figure 1:
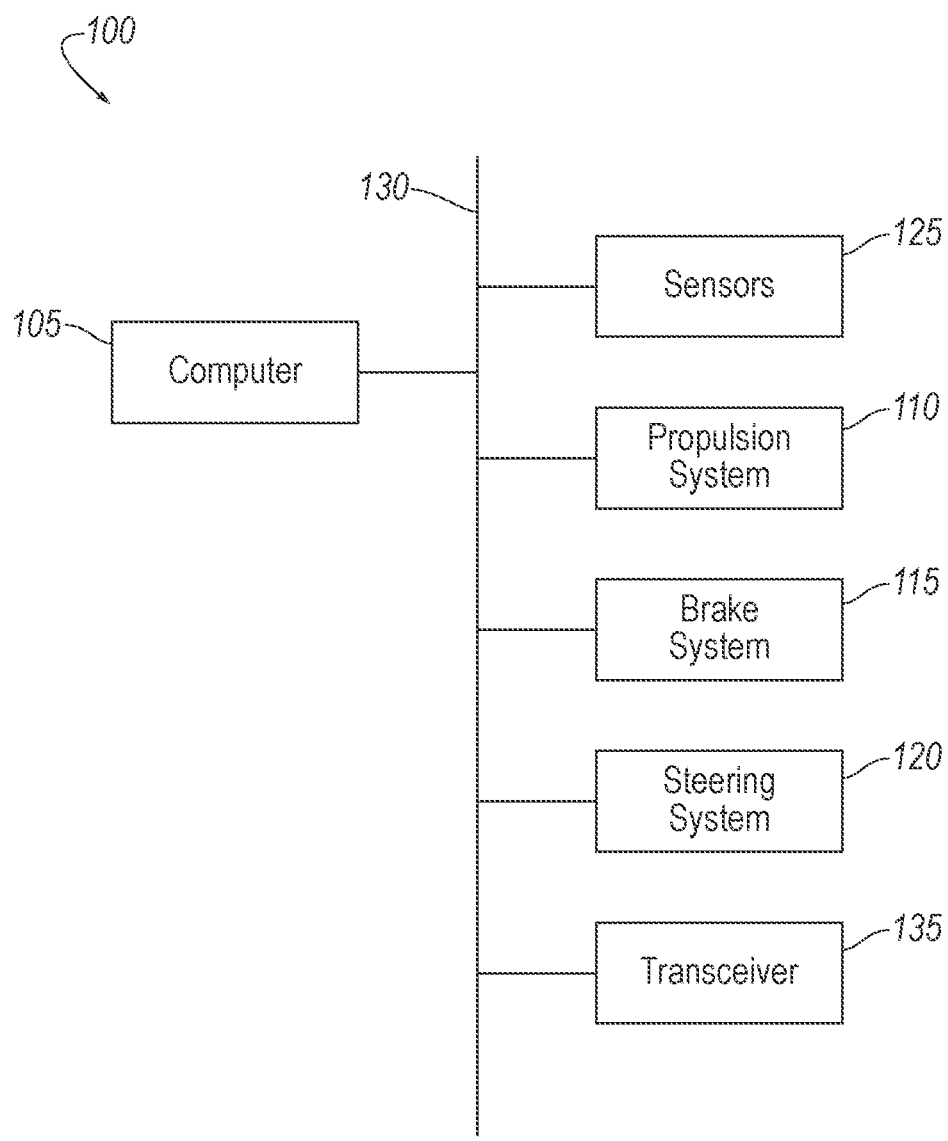
FIG. 1 is a block diagram of an example vehicle.

Autonomous and semi-autonomous vehicles may use points from map data, e.g., waypoints along a lane boundary, for operating the vehicle, e.g., steering the vehicle to keep it within a lane. A high density of points is useful for operating the vehicle within constraints imposed by the environment; however, the computational load for an on-board computer increases quadratically with the number of points. The techniques described herein permit the reduction of the number of points while keeping the vehicle within the constraints from the environment. The computer can be programmed to receive a set of points indicating a lane boundary, select a first subset of the points, determine a path of the lane boundary based on the first subset of the points, and, upon determining that one of the skipped points is greater than a threshold distance from the path, add the skipped point to the first subset. The computer can then use the first subset of the points for operating the vehicle. The number of points, and thus the computational load, is significantly reduced. At the same time, the first subset of the points is accurate within the threshold.

A computer includes a processor and a memory, and the memory stores instructions executable by the processor to receive a set of points indicating a lane boundary; select a first subset of the points, wherein the set of points includes a first point that is not in the first subset; determine a path of the lane boundary based on the first subset of the points; and upon determining that the first point is greater than a threshold distance from the path, add the first point to the first subset.

The instructions may further include instructions to actuate a component of a vehicle based on the first subset of the points. The component may include a brake system.

The component may include a steering system.

Actuating the component may be not based on excluded points from the set of the points that are not in the first subset.

Receiving the set of the points may be based on a location of a vehicle. The set of points may include upcoming points in a direction of travel of the vehicle from the location of the vehicle.

The first subset may include two consecutive points, the set of points may include at least one intermediate point not selected for the first subset between the two consecutive points, the at least one intermediate point may include the first point, and the instructions may further include instructions to, upon determining that none of the at least one intermediate point is greater than the threshold distance from the path, exclude the at least one intermediate point from the first subset.

The path may be a first path, the set of the points may include a second point that is not in the first subset, and the instructions may further include instructions to, after adding the first point to the first subset, determine a second path of the lane boundary based on the first subset of the points; and upon determining that the second point is greater than the threshold distance from the second path, add the second point to the first subset. The first subset may include two consecutive points, the set of the points may include at least two intermediate points not selected for the first subset between the two consecutive points, the at least two intermediate points may include the first point and the second point, and the instructions may further include instructions to, upon determining that none of the at least two intermediate points other than the first point are greater than the threshold distance from the second path, exclude the at least two intermediate points other than the first point from the first subset.

The first subset may include two consecutive points, the set of points may include at least two intermediate points not selected for the first subset between the two consecutive points, the at least two intermediate points may include the first point, and the first point may be farthest from the path of the at least two intermediate points.

Selecting the first subset may include selecting a next point from the set of the points to add to the first subset, and the first point may be between the next point and a most recently added point to the first subset from the set of the points. The next point may be selected from the set of the points to add to the first subset based on the next point being a preset distance from the most recently added point. The instructions may further include instructions to reduce the preset distance based on a radius of curvature between the most recently added point and the next point.

The instructions may further include instructions to reduce the preset distance in response to a radius of curvature between the most recently added point and the next point being less than a curvature threshold. The curvature threshold may be an upper curvature threshold, and reducing the preset distance may include setting the preset distance to a preset minimum distance in response to the radius of curvature being less than a lower curvature threshold that is below the upper curvature threshold. The reduced preset distance may vary from the preset minimum distance when the radius of curvature is equal to the lower curvature threshold to the unreduced preset distance when the radius of curvature is equal to the upper curvature threshold.

The instructions may further include instructions to, upon determining that a number of the points in the set of the points is less than a threshold number, add all the points in the set to the first subset.

The set of the points may include a second point corresponding to a location of a vehicle, and the instructions may further include instructions to add the second point to the first subset.

A method includes receiving a set of points indicating a lane boundary; selecting a first subset of the points, wherein the set of points includes a first point that is not in the first subset; determining a path of the lane boundary based on the first subset of the points; and upon determining that the first point is greater than a threshold distance from the path, adding the first point to the first subset.

With reference to the Figures, wherein like numerals indicate like parts throughout the several views, a computer 105 of a vehicle 100 includes a processor and a memory, and the memory stores instructions executable by the processor to receive a set of points 200 indicating a lane boundary; select a first subset of the points 200, wherein the set of points 200 includes a first point 200 that is not in the first subset; determine a path 300 of the lane boundary based on the first subset of the points 200; and, upon determining that the first point 200 is greater than a threshold distance from the path 300, add the first point 200 to the first subset.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous or semi-autonomous vehicle. The computer 105 can be programmed to operate the vehicle 100 independently of the intervention of a human operator, completely or to a lesser degree. The computer 105 may be programmed to operate a propulsion system 110, a brake system 115, a steering system 120, and/or other vehicle 100 systems based on data from sensors 125. For the purposes of this disclosure, autonomous operation means the computer 105 controls the propulsion system 110, brake system 115, and steering system 120 without input from a human operator; semi-autonomous operation means the computer 105 controls one or two of the propulsion system 110, brake system 115, and steering system 120 and a human operator controls the remainder; and nonautonomous operation means a human operator controls the propulsion system 110, brake system 115, and steering system 120.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 130 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the sensors 125, the propulsion system 110, the brake system 115, the steering system 120, a transceiver 135, and other components via the communications network 130.

The sensors 125 may provide data about operation of the vehicle 100, for example, wheel speed, wheel orientation, and engine and transmission data (e.g., temperature, fuel consumption, etc.). The sensors 125 may detect the location and/or orientation of the vehicle 100. For example, the sensors 125 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 125 may detect the external world, e.g., objects and/or characteristics of surroundings of the vehicle 100, such as other vehicles, road lane markings, traffic lights and/or signs, pedestrians, etc. For example, the sensors 125 may include radar sensors, ultrasonic sensors, scanning laser range finders, light detection and ranging (lidar) devices, and image processing sensors such as cameras.

The propulsion system 110 of the vehicle 100 generates energy and translates the energy into motion of the vehicle 100. The propulsion system 110 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 110 can include an electronic control unit (ECU) or the like that is in communication with and receives input from the computer 105 and/or a human operator. The human operator may control the propulsion system 110 via, e.g., an accelerator pedal and/or a gear-shift lever.

The brake system 115 is typically a conventional vehicle braking subsystem and resists the motion of the vehicle 100 to thereby slow and/or stop the vehicle 100. The brake system 115 may include friction brakes such as disc brakes, drum brakes, band brakes, etc.; regenerative brakes; any other suitable type of brakes; or a combination. The brake system 115 can include an electronic control unit (ECU) or the like that is in communication with and receives input from the computer 105 and/or a human operator. The human operator may control the brake system 115 via, e.g., a brake pedal.

The steering system 120 is typically a conventional vehicle steering subsystem and controls the turning of the wheels. The steering system 120 may be a rack-and-pinion system with electric power-assisted steering, a steer-by-wire system, as both are known, or any other suitable system. The steering system 120 can include an electronic control unit (ECU) or the like that is in communication with and receives input from the computer 105 and/or a human operator. The human operator may control the steering system 120 via, e.g., a steering wheel.

The transceiver 135 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 135 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. The transceiver 135 may be one device or may include a separate transmitter and receiver.

Figure 2:
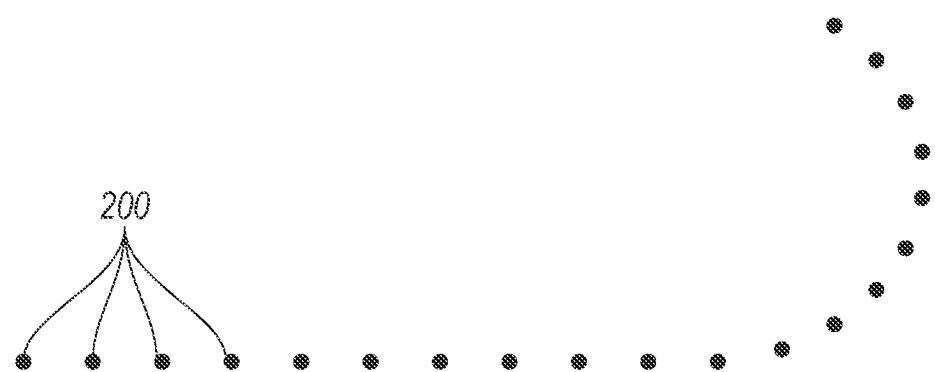
FIG. 2 is a diagram of an example set of points indicating a lane boundary.

With reference to FIG. 2, the computer 105 is programmed to receive a set of points 200 indicating a lane boundary. For example, the computer 105 can retrieve the points 200 from map data stored in memory. For another example, the computer 105 can receive the points 200 from a remote server via the transceiver 135. Receiving the points 200 can be based on a location of the vehicle 100. For example, the set of points 200 can include upcoming points 200 in a direction of travel of the vehicle 100 from the location of the vehicle 100, e.g., up to a range ahead of the location of the vehicle 100.

The points 200 can be represented as coordinates, e.g., as two-dimensional coordinates in a global coordinate system, e.g., (x, y). The computer 105 can convert the coordinates of the points 200 to a local coordinate system that is fixed relative to the vehicle 100 based on a location and heading of the vehicle 100 within a global coordinate system. The points 200 can have a sequence or ordering following the lane boundary, e.g., starting from a point 200 closest to the location of the vehicle 100 or a farthest point 200 opposite the direction of travel of the vehicle 100 and proceeding to a point 200 farthest from the location of the vehicle 100 along the lane boundary.

The computer 105 can be programmed to determine a radius of curvature at a point 200 or for a consecutive set of the points 200. For example, the computer can fit a circle to the point 200 of interest and the points 200 before and after that point 200. The radius of curvature R is the reciprocal of the curvature $\kappa$, i.e., $R=1/\kappa$. The curvature can be found from the following equation:

$$\kappa_i = \frac{\angle t_1 t_2}{|(v_{i+1} - v_i)/2| + |(v_i - v_{i-1})/2|} = \frac{|\arctan t_1 - \arctan t_2|}{|(v_{i+1} - v_i)/2| + |(v_i - v_{i-1})/2|}$$

in which i is an index of the points 200, $t_i$ is a unit vector in the direction from the point 200 of interest to the next point 200, and $v_i$ is the coordinates of the point 200 of interest. The unit vector $t_i$ is given by the following expression:

$$t_i = \frac{v_{i+1} - v_i}{|v_{i+1} - v_i|}$$

For a consecutive set of at least four points 200, the computer 105 can fit a circle to the consecutive set of the points 200, i.e., determine a center point and radius defining a circle that best fits the points 200, e.g., using a least-squares fit. The radius of the fitted circle can then be used as the radius of curvature of the consecutive set of the points 200.

Figure 3A:
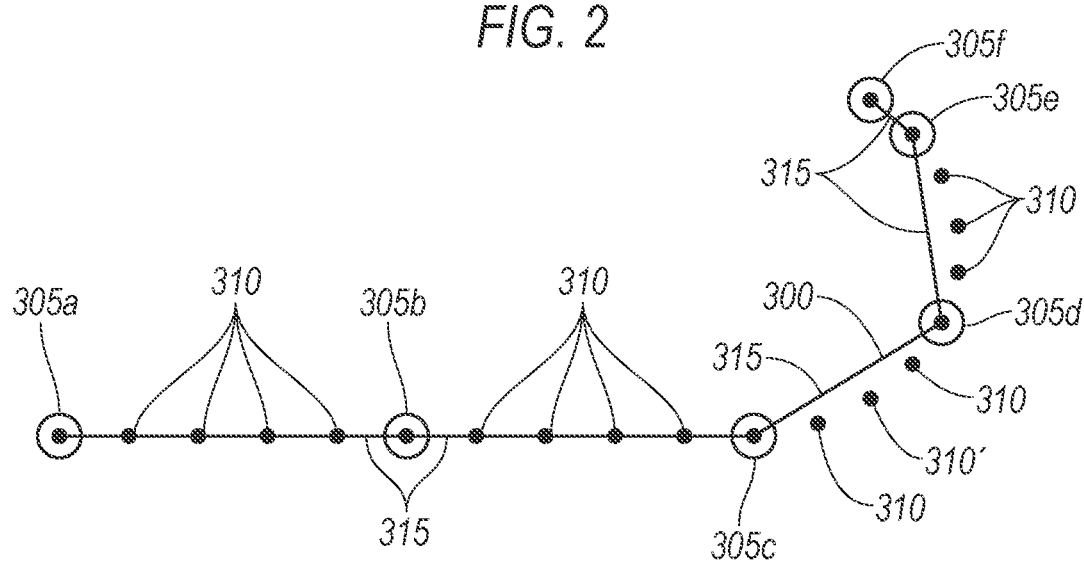
FIG. 3A is a diagram of the set of points with a subset of the points defining a path.

With reference to FIG. 3A, the computer 105 can be programmed to select the first subset of the points 200. The points 200 in the first subset will be referred to as subset points 305. As shown in the example of FIG. 3A, the first subset includes a first subset point 305a, a second subset point 305b, a third subset point 305c, a fourth subset point 305d, a fifth subset point 305e, and a sixth subset point 305f. The first subset includes fewer points 200 than are in the set. The set of the points 200 includes skipped points 310 not selected for the first subset. For two consecutive subset points 305 in the first subset, the set of the points 200 can include at least one skipped point 310 that is an intermediate point 200 between the two consecutive subset points 305, e.g., as shown in FIG. 3A, four skipped points 310 intermediate between the first subset point 305a and the second subset point 305b.

Selecting the first subset can include selecting a next subset point 305 from the set of the points 200 to add to the first subset. The next subset point 305 can be selected from the set of the points 200 to add to the first subset based on the next subset point 305 being a preset distance D from the most recently added subset point 305. This step can be repeated to populate the first subset. The preset distance D can be adjustable, as described below. To take the example of FIG. 3A, the first point 200 in the set on the left can be added to the first subset as the first subset point 305a, and then if the fourth point 200 is less than the preset distance D from the first point 200 and the fifth point 200 is greater than the preset distance D from the first point 200, the fifth point 200 can be added to the first subset as the second subset point 305b. Then, with the fifth point 200 as the most recently added point 200, if the ninth point 200 is less than the preset distance D from the fifth point 200 and the tenth point 200 is greater than the preset distance D from the fifth point 200, the tenth point 200 can be added to the first subset as the third subset point 305c, and so on.

The preset distance D can have a default value equal to an unreduced preset distance $D_{max}$ stored in the memory of the computer 105. The unreduced preset distance $D_{max}$ can be chosen to accurately represent a road with waypoints for purposes of steering a vehicle 100.

The computer 105 can be programmed to reduce the preset distance D from the unreduced preset distance $D_{max}$ based on the radius of curvature R of a current point 200 or a consecutive subset of the points 200. For example, the consecutive subset of the points 200 can be the points 200 between the most recently added subset point 305 and the next point 200 to be added to the first subset, e.g., the next point 200 to be added to the first subset in accordance with the unreduced preset distance $D_{max}$. For example, reducing the preset distance D can occur in response to the radius of curvature R being less than an upper curvature threshold $R_{hi}$ (or, equivalently, the curvature $\kappa=1/R$ being greater than a threshold $\kappa_{lo}$). A quantity of the reduction of the radius of curvature R can depend on a difference between the radius of curvature R and the upper curvature threshold $R_{hi}$.

Reducing the preset distance D may include setting the preset distance D to a preset minimum distance $D_{min}$ in response to the radius of curvature R being less than a lower curvature threshold $R_{lo}$ (or, equivalently, the curvature $\kappa$ being greater than a threshold $\kappa_{hi}$). The lower curvature threshold $R_{lo}$ is below the upper curvature threshold $R_{hi}$. The preset distance can vary, e.g., increase, from the preset minimum distance $D_{min}$ when the radius of curvature R is equal to the lower curvature threshold $R_{lo}$ to the unreduced preset distance $D_{max}$ when the radius of curvature R is equal to the upper curvature threshold $R_{hi}$, e.g., increase linearly with the radius of curvature R, as given in the following formula:

$$D = \begin{cases} D_{max} & R > R_{hi} \\ \frac{D_{max} - D_{min}}{R_{hi} - R_{lo}} R + \frac{R_{hi}D_{min} - R_{lo}D_{max}}{R_{hi} - R_{lo}} & R_{lo} < R < R_{hi} \\ D_{min} & R < R_{hi} \end{cases}$$

The computer 105 can be programmed to determine the path 300 of the lane boundary based on the first subset of the points 200, i.e., on the subset points 305. For example, the computer 105 can generate the path 300 by placing straight segments 315 connecting each pair of consecutive subset points 305, as shown in FIG. 3.

The computer 105 can be programmed to determine distances from one or more of the skipped points 310 to the path 300, e.g., of each of the skipped points 310 between the most recently added subset point 305 and the next point 200 to be added to the first subset. Each distance can be a shortest distance from that skipped point 310 to the path 300, e.g., to the segment 315 connecting the subset points 305 that the skipped point 310 is between. The distance from the skipped point 310 to the respective segment 315 can be determined geometrically, as is known. The computer 105 can select the greatest distance, i.e., the distance to the path 300 from the skipped point 310 that is farthest from the path 300 (from the skipped points 310 between the most recently added subset point 305 and the next point 200 to be added to the first subset). To take the example of FIG. 3A, if the third subset point 305c is the most recently added subset point 305 and the fourth subset point 305d is the next point 200 to be added to the subset, then the second skipped point 310 of the three skipped points 310 between the third subset point 305c and the fourth subset point 305d is the farthest skipped point 310' from the path 300.

The computer 105 can be programmed to determine whether the greatest distance is greater than a threshold distance, i.e., whether the farthest skipped point 310' from the path 300 is greater than the threshold distance from the path 300. If the greatest distance is less than the distance threshold, then none of the skipped points 310 is greater than the threshold distance from the path 300.

Figure 3B:
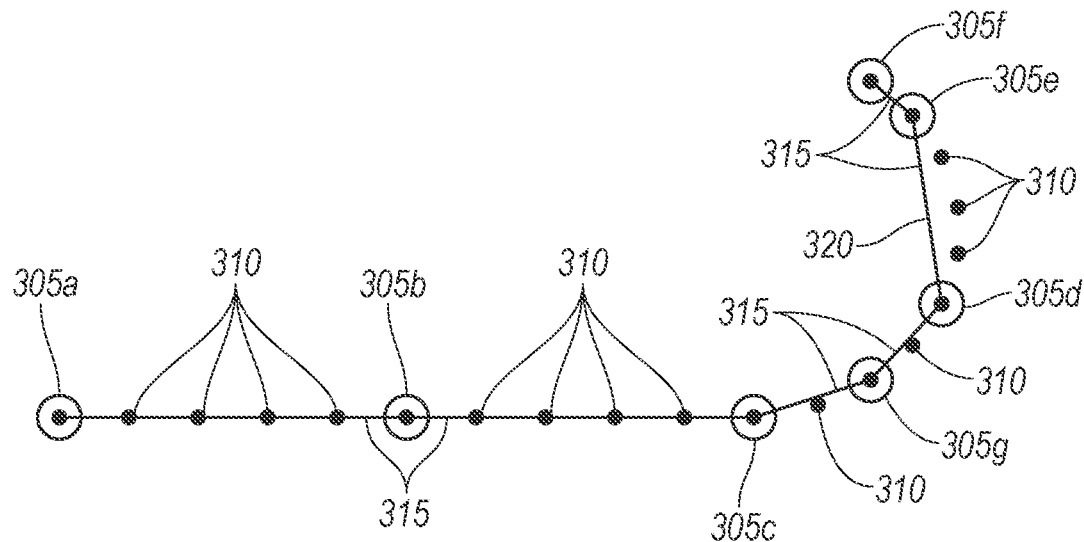
FIG. 3B is a diagram of the set of points with an updated subset defining an updated path.

With reference to FIG. 3B, the computer 105 can be programmed to, upon determining that the farthest skipped point 310' is greater than the threshold distance from the path 300, add the farthest skipped point 310' to the first subset, i.e., reclassify the skipped point 310 as a subset point 305. As an example, FIG. 3B shows that the farthest skipped point 310' between the third and fourth subset points 305c,d in FIG. 3A is now a new subset point 305g. The computer 105 can be programmed to, upon determining that none of the skipped points 310 is greater than the threshold distance from the path 300, exclude the skipped points 310 from the first subset, i.e., leave the skipped points 310 classified as skipped points 310.

The computer 105 can be programmed to, after adding the farthest skipped point 310' to the first subset, determine a second path 320 of the lane boundary based on the first subset of the points 200. The computer 105 determines the second path 320 in the same manner as described above for determining the path 300, except that the farthest skipped point 310' is now classified as a subset point 305. Thus, instead of a segment 315 between the third subset point 305c and the fourth subset point 305d, the path 300 includes segments 315 between the third subset point 305c and the new subset point 305g and between the new subset point 305g and the fourth subset point 305d. The computer 105 can be programmed to repeat the steps above for the remaining skipped points 310 between the most recently added subset point 305 and the next point 200 to be added to the first subset. Upon determining that a farthest one of the remaining skipped points 310 is greater than the threshold distance from the second path 320, the computer 105 adds that skipped point 310 to the first subset, determines a new path 300, and checks the other remaining skipped points 310. These steps repeat until none of the remaining skipped points 310 is greater than the threshold distance from the most recent iteration of the path 300. Upon determining that none of the remaining skipped points 310 is greater than the threshold distance from the path 300, the computer 105 excludes the remaining skipped points 310.

Figure 4:
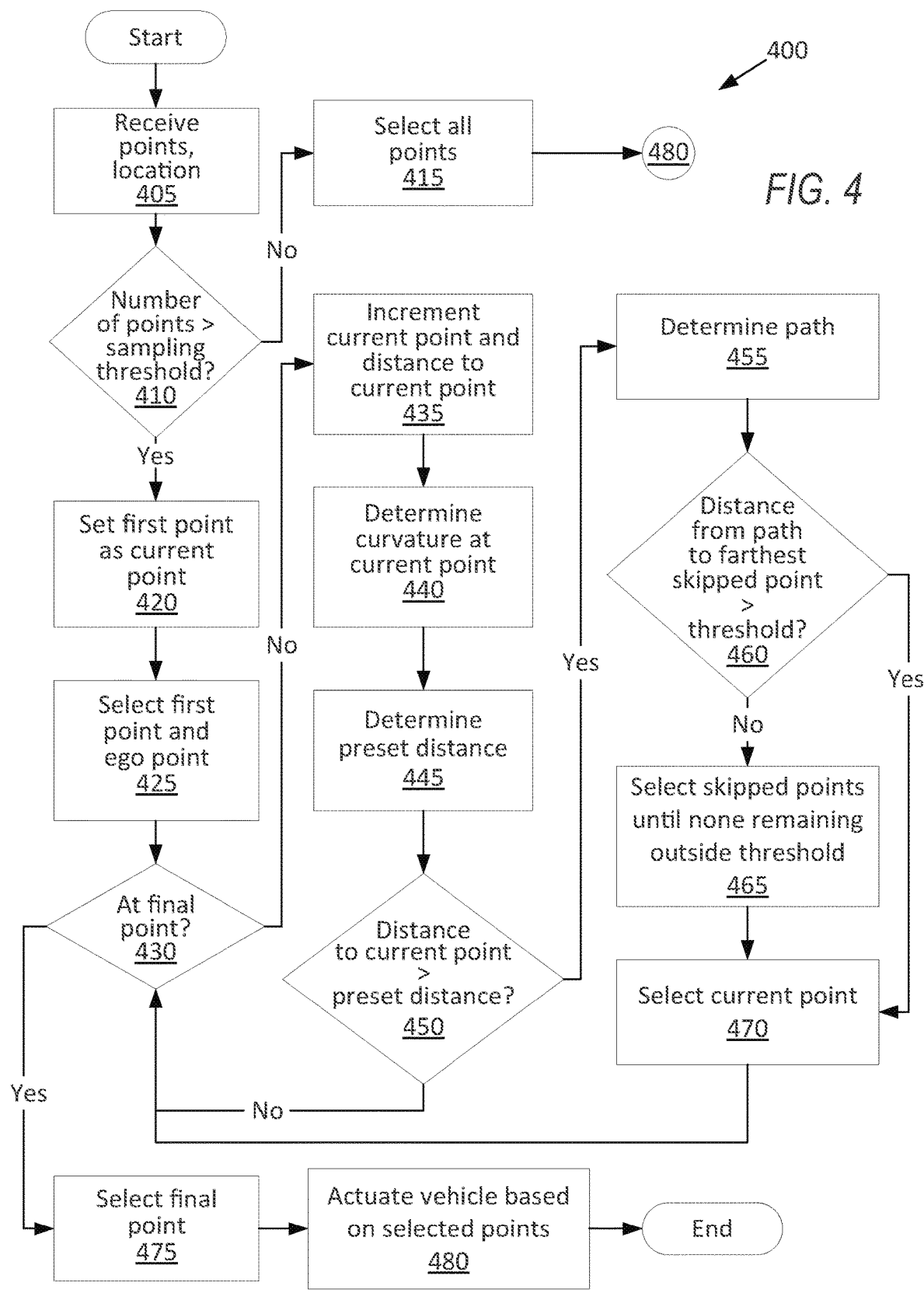
FIG. 4 is a process flow diagram of an example process for determining the subset of the set of points.

FIG. 4 is a process flow diagram illustrating an example process 400 for determining the first subset of the points 200 and operating the vehicle 100 based on the first subset of the points 200. The memory of the computer 105 stores executable instructions for performing the steps of the process 400 and/or programming can be implemented in structures such as mentioned above. As a general overview of the process 400, the computer 105 receives the set of the points 200 and the location of the vehicle 100. If the number of points 200 in the set is below a sampling threshold, the computer 105 selects all the points 200 in the set as the first subset. Otherwise, the computer 105 adds the first point 200 and an ego point 200 to the first subset. For each point 200 in turn, the computer 105 determines the radius of curvature R and the preset distance D. If the preset distance D is less than a distance from the most recently added subset point 305 to the current point 200, then the computer 105 determines whether the farthest skipped point 310' between the most recently added subset point 305 and the current point 200 is greater than the threshold distance from the path 300 and, if so, adds the skipped points 310 to the first subset while updating the path 300 until none of the remaining skipped points 310 are greater than the threshold distance from the path 300. Also if the preset distance D is less than the distance from the most recently added subset point 305 to the current point 200, then the computer 105 adds the current point 200 to the first subset. Once the computer 105 has cycled through each point 200 in the set of the points 200, the computer 105 adds the final point 200 to the first subset and actuates the vehicle 100 based on the subset points 305.

The process 400 begins in a block 405, in which the computer 105 receives the set of the points 200, as described above. The computer 105 may also receive the location of the vehicle 100, e.g., from a GPS sensor of the sensors 125, and the set of the points 200 can be based on the location, as described above.

Next, in a decision block 410, the computer 105 determines whether the number of points 200 in the set is less than a threshold number. The threshold number can be chosen to indicate that there are too few points 200 to downsample the points 200, e.g., the set has only three points 200. In response to the number of points 200 being less than the threshold number, the process 400 proceeds to a block 415. In response to the number of points 200 being at least as great as the threshold number, the process 400 proceeds to a block 420.

In the block 415, the computer 105 adds all the points 200 in the set to the first subset. After the block 415, the process 400 proceeds to a block 480.

In the block 420, the computer 105 designates a sequentially first point 200 in the set of the points 200 as a current point 200.

Next, in a block 425, the computer 105 adds the first point 200 to the first subset, and the computer 105 adds a point 200 corresponding to the location of the vehicle 100 to the first subset, e.g., the point 200 closest to the location of the vehicle 100 (if that point 200 is different than the first point 200).

Next, in a decision block 430, the computer 105 determines whether the current point 200 is the sequentially final point 200 of the set of the points 200. If so, the process 400 proceeds to a block 475. Otherwise, the process 400 proceeds to a block 435.

In the block 435, the computer 105 designates the sequentially next point 200 from the current point 200 as the new current point 200. The computer 105 determines the distance from the most recently selected subset point 305 to the current point 200.

Next, in a block 440, the computer 105 determines the radius of curvature R around the current point 200, as described above.

Next, in a block 445, the computer 105 determines the preset distance D based on the radius of curvature R, as described above.

Next, in a decision block 450, the computer 105 determines whether the distance to the current point 200 from the block 435 is at least as great as the preset distance from the block 445. If the distance is at least as great as the preset distance, the process 400 proceeds to a block 455. If the distance is less than the preset distance, the process 400 returns to the decision block 430 to cycle to the sequentially next point 200 in the set.

In the block 455, the computer 105 determines the path 300 based on the subset points 305 and including the current point 200, as described above.

Next, in a decision block 460, the computer 105 determines whether the farthest skipped point 310' between the most recently added subset point 305 and the current point 200 is greater than the threshold distance from the path 300 determined in the block 455, as described above. Upon determining that the farthest skipped point 310' is greater than the threshold distance from the path 300, the process 400 proceeds to a block 465. Upon determining that none of the skipped points 310 are greater than the threshold distance from the path 300, the process 400 proceeds to a block 470.

In the block 465, the computer 105 adds the farthest skipped point 310' to the first subset. The computer 105 repeatedly redetermines the path 300 and adds the next farthest skipped point 310' to the first subset until none of the remaining skipped points 310 are greater than the threshold distance from the path 300, as described above. The computer 105 excludes any remaining skipped points 310 from the first subset. After the block 465, the process 400 proceeds to the block 470.

In the block 470, the computer 105 adds the current point 200 to the first subset. After the block 470, the process 400 returns to the decision block 430 to cycle to the sequentially next point 200 in the set.

In the block 475, the computer 105 adds the sequentially final point 200 to the first subset. After the block 475, the process 400 proceeds to the block 480.

In the block 480, the computer 105 actuates a component of the vehicle 100 based on the first subset of the points 200. The component can include, e.g., one or more of the propulsion system 110, the brake system 115, and the steering system 120. For example, the computer 105 can actuate the steering system 120 as part of a lane-centering assist or lane-keeping assist feature, e.g., steering the vehicle 100 to keep the vehicle 100 at least a threshold margin away from the lane boundary as represented by the subset points 305. For another example, the computer 105 can actuate the brake system 115 as part of an automatic-braking feature to prevent the vehicle 100 from crossing the lane boundary as represented by the subset points 305. For another example, the computer 105 can operate the vehicle 100 autonomously by actuating the propulsion system 110, the brake system 115, and the steering system 120 to navigate the vehicle 100 on roads having their lane boundaries represented by the subset points 305. Actuating the component may be not based on excluded points 200, i.e., the remaining skipped points 310 from the set of points 200 that were not added to the first subset. Using the first subset and not the excluded points 200 can decrease the computational load on the computer 105 and may permit realtime operation. After the block 480, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
    receive a set of points indicating a lane boundary;
    select a first subset of the points, wherein the set of points includes a first point that is not in the first subset, the first subset includes two consecutive points, the set of points includes at least one intermediate point not selected for the first subset between the two consecutive points, and the at least one intermediate point includes the first point;
    determine a path of the lane boundary based on the first subset of the points;
    upon determining that the first point is greater than a threshold distance from the path, add the first point to the first subset;
    upon determining that none of the at least one intermediate point is greater than the threshold distance from the path, exclude the at least one intermediate point from the first subset; and
    actuate a component of a vehicle based on the first subset of the points.

2. The computer of claim 1, wherein the component includes a brake system.

3. The computer of claim 1, wherein the component includes a steering system.

4. The computer of claim 1, wherein actuating the component is not based on excluded points from the set of points that are not in the first subset.

5. The computer of claim 1, wherein receiving the set of points is based on a location of a vehicle.

6. The computer of claim 5, wherein the set of points includes upcoming points in a direction of travel of the vehicle from the location of the vehicle.

7. The computer of claim 1, wherein the path is a first path, the set of points includes a second point that is not in the first subset, and the instructions further include instructions to:
    after adding the first point to the first subset, determine a second path of the lane boundary based on the first subset of the points; and
    upon determining that the second point is greater than the threshold distance from the second path, add the second point to the first subset.

8. The computer of claim 7, wherein the first subset includes two second consecutive points, the set of points includes at least two second intermediate points not selected for the first subset between the two second consecutive points, the at least two second intermediate points include the first point and the second point, and the instructions further include instructions to, upon determining that none of the at least two second intermediate points other than the first point are greater than the threshold distance from the second path, exclude the at least two second intermediate points other than the first point from the first subset.

9. The computer of claim 1, wherein the first subset includes two second consecutive points, the set of points includes at least two second intermediate points not selected for the first subset between the two second consecutive points, the at least two second intermediate points includes the first point, and the first point is farthest from the path of the at least two second intermediate points.

10. The computer of claim 1, wherein selecting the first subset includes selecting a next point from the set of points to add to the first subset, and the first point is between the next point and a most recently added point to the first subset from the set of points.

11. The computer of claim 10, wherein the next point is selected from the set of points to add to the first subset based on the next point being a preset distance from the most recently added point.

12. The computer of claim 11, wherein the instructions further include instructions to reduce the preset distance based on a radius of curvature between the most recently added point and the next point.

13. The computer of claim 11, wherein the instructions further include instructions to reduce the preset distance in response to a radius of curvature between the most recently added point and the next point being less than a curvature threshold.

14. The computer of claim 13, wherein the curvature threshold is an upper curvature threshold, and reducing the preset distance includes setting the preset distance to a preset minimum distance in response to the radius of curvature being less than a lower curvature threshold that is below the upper curvature threshold.

15. The computer of claim 14, wherein the reduced preset distance varies from the preset minimum distance when the radius of curvature is equal to the lower curvature threshold to the unreduced preset distance when the radius of curvature is equal to the upper curvature threshold.

16. The computer of claim 1, wherein the instructions further include instructions to, upon determining that a number of the points in the set of points is less than a threshold number, add all the points in the set to the first subset.

17. The computer of claim 1, wherein the set of points includes a second point corresponding to a location of a vehicle, and the instructions further include instructions to add the second point to the first subset.

18. A method comprising:
receiving a set of points indicating a lane boundary;
selecting a first subset of the points, wherein the set of points includes a first point that is not in the first subset, the first subset includes two consecutive points, the set of points includes at least one intermediate point not selected for the first subset between the two consecutive points, and the at least one intermediate point includes the first point;
determining a path of the lane boundary based on the first subset of the points;
upon determining that the first point is greater than a threshold distance from the path, adding the first point to the first subset;
upon determining that none of the at least one intermediate point is greater than the threshold distance from the path, excluding the at least one intermediate point from the first subset; and
actuating a component of a vehicle based on the first subset of the points.

19. A computer comprising a processor and a memory, the memory storing instructions executable by the processor to:
receive a set of points indicating a lane boundary;
select a first subset of the points, wherein the set of points includes a first point that is not in the first subset;
determine a path of the lane boundary based on the first subset of the points;
upon determining that the first point is greater than a threshold distance from the path, add the first point to the first subset; and
actuate a component of a vehicle based on the first subset of the points;
wherein selecting the first subset includes selecting a next point from the set of points to add to the first subset; and
the first point is between the next point and a most recently added point to the first subset from the set of points.

20. A computer comprising a processor and a memory, the memory storing instructions executable by the processor to:
receive a set of points indicating a lane boundary;
select a first subset of the points, wherein the set of points includes a first point that is not in the first subset;
determine a path of the lane boundary based on the first subset of the points;
upon determining that the first point is greater than a threshold distance from the path, add the first point to the first subset;
upon determining that a number of the points in the set of points is less than a threshold number, add all the points in the set to the first subset; and
actuate a component of a vehicle based on the first subset of the points.

* * * * *